Dec. 29, 1931.                D. M. SMALLE                1,838,517
                    METHOD OF PRESERVING ORANGE JUICE
                            Filed Dec. 4, 1930
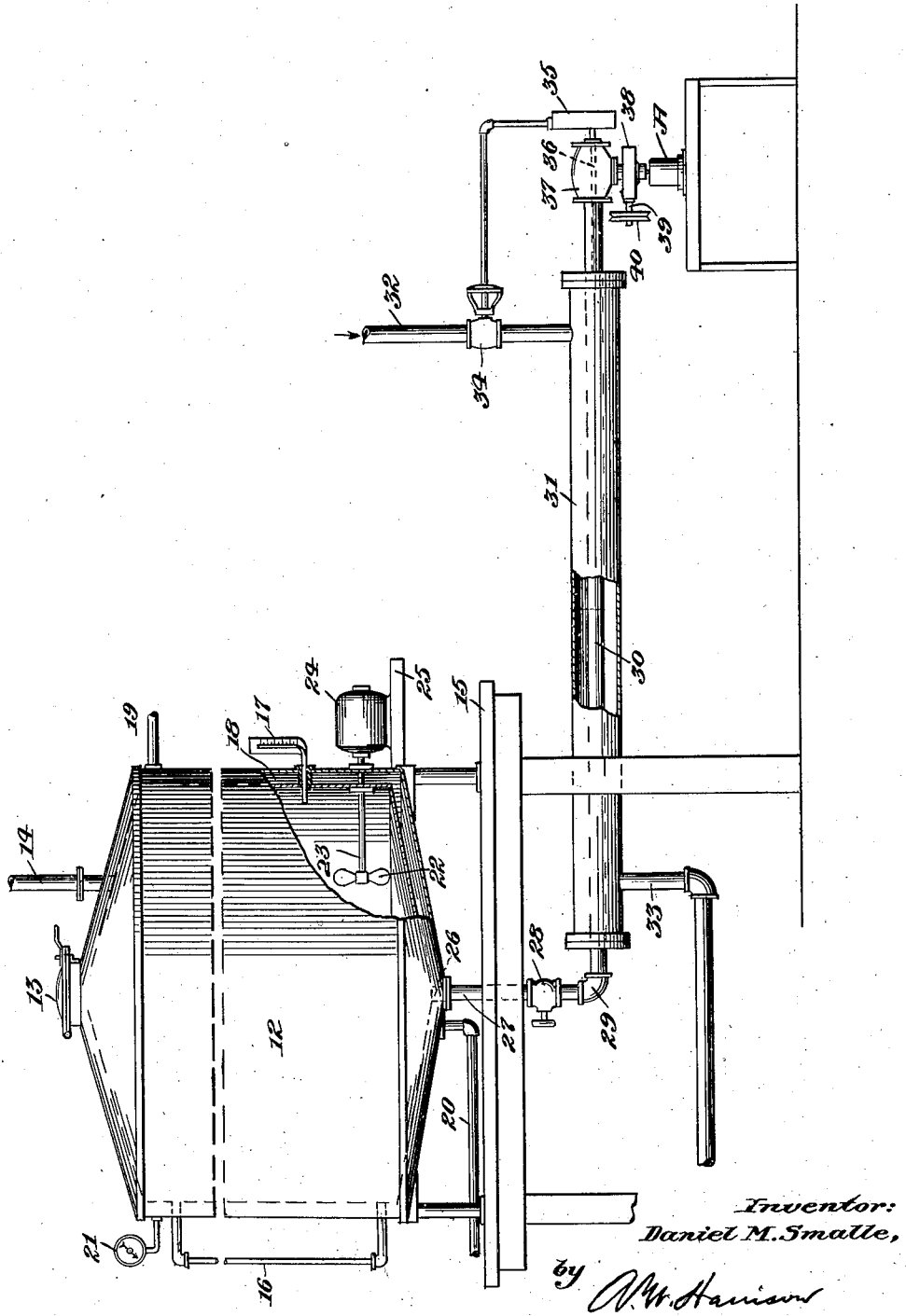
Inventor:
Daniel M. Smalle,
by
Atty.

Patented Dec. 29, 1931

1,838,517

UNITED STATES PATENT OFFICE

DANIEL M. SMALLE, OF ORLANDO, FLORIDA, ASSIGNOR OF SIX-TENTHS TO DR. P. PHILLIPS COMPANY, OF ORLANDO, FLORIDA, A CORPORATION OF FLORIDA

METHOD OF PRESERVING ORANGE JUICE

Application filed December 4, 1930. Serial No. 499,914.

This invention relates to the preservation of unclarified orange juice, in sterile condition, and refers particularly to the method of treatment, and the apparatus for effecting the treatment, to prepare the juice for sealing in suitable containers.

So far as I am aware the methods heretofore employed in the treatment of orange juice for supply to the trade and users have not been such as to ensure preservation of the juice for any considerable length of time in a condition retaining the natural color, flavor and vitamins.

I have discovered that by causing the juice, after treatment in a heated tank to prevent fermentation from starting in, to flow continuously through a heated conduit to the container-filling mechanism, the natural flavor and the healthful vitamins of the fresh fruit are retained.

Preliminary to an explanation of my improved process, I will describe the apparatus which I have developed for carrying out said process, said apparatus being illustrated in one of its embodiments in the accompanying drawing in which the figure is a side elevation of the essential parts of the apparatus, partly broken out and in section.

The apparatus includes a storage tank 12 of such size as may be preferable, having a closable cover 13, a pipe for the supply of juice to the tank being indicated at 14, said tank being mounted on a platform 15. The tank is equipped with a depth-gauge glass 16, and a visible thermometer 17, and is double-walled to provide a steam jacket 18 to which steam may enter through a supply pipe 19 and from which it may pass through an outlet pipe 20. And the usual steam gauge is indicated at 21. The parts of the apparatus so far as described may be understood of a well-known construction, and the same may be said of the juice agitator 22 the shaft 23 of which is rotated by a motor 24 mounted on bracket 25.

The tank outlet 26 is connected by a pipe 27, having a valve 28, to an elbow 29, the latter being connected to a pipe 30 which, with other parts presently described, constitutes an important feature of my improved apparatus. Said pipe may be of greater length than illustrated, relatively to the size of the rest of the apparatus. Said pipe is kept at an approximate temperature as explained hereinafter by suitable means, preferably steam. For this purpose in the embodiment of the invention illustrated, the pipe 30 is enclosed in an outer pipe 31 to provide a steam jacket to which a steam supply pipe 32 leads and from which the steam may escape through an outlet pipe 33.

It is important that the temperature of the pipe 30 shall be automatically controlled for reasons presently explained. For this purpose, the apparatus illustrated includes an automatic valve 34 of well-known type, in the steam-supply pipe 32, said valve being controlled by a temperature governor 35 the thermostatic strip 36 of which, or equivalent, is located in a casing 37 through which the juice passes to an automatic timed measuring filler apparatus 38 of well-known type, the shaft 39 of said filler having a pulley by which the filler is driven by a suitable motor not necessary to illustrate. The filler delivers the juice to suitable containers, such as cans, one of which is illustrated at A on a suitable support which, in practice, usually effects automatic presentation of successive containers to position under the filler.

In carrying out my invention, the orange pulp and juice which have been first passed through a suitable strainer to separate the seeds and rag therefrom, is supplied to the tank 12 which is enamel-lined or of acid-resisting material, and while in said tank is subjected to a temperature of 50° to 60° C. for a period of 5 to 15 minutes, and held therein at a temperature sufficiently high to prevent the starting of fermentation, and is constantly agitated in the tank.

Upon opening the valve 28, the juice passes through the pipe 30 which is of acid-resisting material and which is kept at such temperature that the continuously flowing juice on its way to the container-filling apparatus, is raised to a temperature of 65° to 75° C., but so regulated by the temperature control 35 that the flowing juice will at no time reach a temperature higher than is necessary to kill the germs of fermentation, yeast, etc., but which temperature is low enough to retain in the juice the natural flavor and the healthful vitamins of the fresh fruit. To effect this, it is essential that the flow of the juice shall be continuous.

The apparatus illustrated for carrying out the process is so synchronized by the operation of the container-filling apparatus of such type as indicated at the right of the figure of the drawing, that the temperature of the flowing juice in the pipe 30 never varies materially.

By my improved process and apparatus, I am able to fill containers with orange juice which retains all the esters and vitamins, and with the natural flavor and color preserves indefinitely. The method prevents oxidation, and prevents enzymic action of pulp in juice.

I do not claim herein the apparatus hereinbefore described, as the same forms the subject-matter of a divisional application filed November 6, 1931, Serial No. 573,391.

Having now described my invention, I claim:

1. The method of treating orange juice to effect the preservation thereof, consisting in supplying the juice to a tank, subjecting the juice to a temperature of 50° to 60° C. for five to fifteen minutes in said tank and then subjecting the juice, while flowing continuously and evenly, to a temperature of 65° to 75° C. to effect pasteurization while traveling.

2. The method of treating orange juice to effect the preservation thereof, consisting in supplying the juice to a tank, subjecting the juice to a temperature of 50° to 60° C. for five to fifteen minutes in said tank, then subjecting the juice, while flowing continuously and evenly, to a temperature of 65° to 75° C. to effect pasteurization while traveling, and finally transferring the flowing juice to containers and sealing the latter.

In testimony whereof I have affixed my signature.

DANIEL M. SMALLE.